United States Patent
Dhoolia et al.

(10) Patent No.: US 9,710,361 B2
(45) Date of Patent: Jul. 18, 2017

(54) SMART PROGRAMMING PLAYGROUNDS

(71) Applicant: International Business Machines Corporation, Armonk, NY (US)

(72) Inventors: Pankaj Dhoolia, Ghaziabad (IN); Senthil Kumar Kumarasamy Mani, Gurgaon (IN); Rohan Raju Padhye, New Delhi (IN); Vibha Singhal Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 14/631,446

(22) Filed: Feb. 25, 2015

(65) Prior Publication Data

US 2016/0246704 A1    Aug. 25, 2016

(51) Int. Cl.
*G06F 9/44* (2006.01)
*G06F 11/36* (2006.01)

(52) U.S. Cl.
CPC .............................. *G06F 11/3664* (2013.01)

(58) Field of Classification Search
CPC .... G06F 11/3664; G06F 11/3624; G06F 8/33; G06F 11/3668; G06F 8/00; G06F 8/34; G06F 9/546
USPC .................................................. 717/124–125
See application file for complete search history.

(56) References Cited

U.S. PATENT DOCUMENTS

| | | | |
|---|---|---|---|
| 7,921,216 B2* | 4/2011 | Critchley | G06F 9/546 709/227 |
| 8,234,620 B1* | 7/2012 | Bychkov | G06F 8/00 717/100 |
| 8,572,560 B2 | 10/2013 | Drissi et al. | |
| 2005/0223363 A1* | 10/2005 | Black-Ziegelbein | G06F 11/3624 717/127 |
| 2010/0050151 A1* | 2/2010 | Balasubramanian | G06F 8/33 717/105 |
| 2012/0174061 A1* | 7/2012 | Mccollum | G06F 8/33 717/106 |
| 2014/0282385 A1* | 9/2014 | Dattke | G06F 8/33 717/113 |

(Continued)

FOREIGN PATENT DOCUMENTS

WO    WO2007084780 A2    7/2007

OTHER PUBLICATIONS

Wightman, Doug, et al., "SnipMatch: Using Source Code Context to Enhance Snippet Retrieval and Parameterization", ACM Symposium on User Interface Software and Technology (UIST '12), Oct. 7-10, 2012, Cambridge, MA, USA, 10 pages, ACM Digital Library.

(Continued)

*Primary Examiner* — Laura Gudorf
(74) *Attorney, Agent, or Firm* — Ference & Associates LLC (57) ABSTRACT

Methods and arrangements for testing a code portion. A contemplated method includes: providing a workspace, at a user interface, for testing a code portion; configuring the workspace to execute the code portion; analyzing the code portion to determine at least one defining aspect of the code portion; based on the determining of at least one defining aspect, determining one or more resources referenced in the code portion; and ensuring availability of the one or more resources referenced in the code portion. Other variants and embodiments are broadly contemplated herein.

20 Claims, 4 Drawing Sheets

(56) References Cited

U.S. PATENT DOCUMENTS

2015/0186648 A1* 7/2015 Lakhotia ............... G06F 21/563
      726/22

OTHER PUBLICATIONS

Dagenais, Barthelemy, et al., "Enabling Static Analysis for Partial Java Programs", Proceedings of the 23rd ACM SIGPLAN Conference on Object-oriented Programming Systems Languages and Applications (OOPSLA '08), Oct. 19-23, 2008, Nashville, TN, USA., 16 pages, ACM Digital Library.
Runnable, Product website available at: http://runnable.com/, 1 pages, Accessed on Jan. 27, 2015.
Jsfiddle, Product website available at: http://jsfiddle.com/, 1 page, Accessed on Jan. 27, 2015.
Java Repl, Product website available at: http://www.javarepl.com/console.html, 1 page, Accessed on Jan. 27, 2015.
Ballard, Rick, et al., "Swift Playgrounds", Tools, #WWDC14, Session 408, 2014, 134 pages, Apple, Inc.

* cited by examiner

Q. [JDBC] How can I get all values of a column in an SQL table into a List?

A. Try using commons-dbutils from Apache:

```
QueryRunner runner = new QueryRunner(dataSource);
List<String> strings =
runner.query("SELECT * FROM my_table",
    new ColumnListHandler<String>(columnIndex));
```

SMART PROGRAMMING PLAYGROUNDS

BACKGROUND

Generally, modern integrated development environments (IDEs) have come to contain sophisticated components for inferring missing types, correcting bad syntax and completing partial expressions in code, but they are limited to a context that is explicitly defined in a project's configuration. Thus, these tools tend to be ill-suited for quick prototyping of incomplete code snippets picked off the Web (alternatively referred to herein as "code fragments") or shared by fellow colleagues to demonstrate the use of a particular application programming interface (API) that is not already configured in a workspace. Further, in many cases, the resolution of programming context itself is insufficient to make a snippet of code executable, since it may involve interaction with external services that may need to be set-up separately.

BRIEF SUMMARY

In summary, one aspect of the invention provides a method of testing a portion of computer code, the method comprising: utilizing at least one processor to execute computer code configured to perform the steps of: providing a workspace, at a user interface, for testing a code portion; configuring the workspace to execute the code portion; analyzing the code portion to determine at least one defining aspect of the code portion; based on the determining of at least one defining aspect, determining one or more resources referenced in the code portion; and ensuring availability of the one or more resources referenced in the code portion.

Another aspect of the invention provides an apparatus for testing a portion of computer code, the apparatus comprising: at least one processor; and a computer readable storage medium having computer readable program code embodied therewith and executable by the at least one processor, the computer readable program code comprising: computer readable program code configured to provide a workspace, at a user interface, for testing a code portion, wherein the workspace is configured to execute the code portion; computer readable program code configured to analyze the code portion to determine at least one defining aspect of the code portion; computer readable program code configured, based on the determining of at least one defining aspect, to determine one or more resources referenced in the code portion; and computer readable program code configured to ensure availability of the one or more resources referenced in the code portion.

An additional aspect of the invention provides a computer program product for testing a portion of computer code, the computer program product comprising: a computer readable storage medium having computer readable program code embodied therewith, the computer readable program code comprising: computer readable program code configured to provide a workspace, at a user interface, for testing a code portion, wherein the workspace is configured to execute the code portion; computer readable program code configured to analyze the code portion to determine at least one defining aspect of the code portion; computer readable program code configured, based on the determining of at least one defining aspect, to determine one or more resources referenced in the code portion; and computer readable program code configured to ensure availability of the one or more resources referenced in the code portion.

A further aspect of the invention provides a method comprising: providing a workspace, at a user interface, for testing a code portion; configuring the workspace to execute the code portion; analyzing the code portion to determine at least one defining aspect of the code portion; based on the determining of at least one defining aspect, determining one or more resources referenced in the code portion; and ensuring availability of the one or more resources referenced in the code portion; wherein the determining of at least one defining aspect comprises: determining one or more external code dependencies inherent in the code portion; determining syntactic incompleteness of the code portion; and determining a program entry point for the code portion; wherein the code portion comprises code composed at the workspace; and wherein the workspace permits selection of a resource with which to compose the code.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which provide a smart programming playground that extends to programming with distributed components or services by inferring the context of such programming and enabling automatic instantiations-of, binding-to, seeding-of, and interacting-with such components or service contexts, to enable interactive try-it programming. There can also be involved an inferring of the programming context from partial code snippets, based on semantic understanding of programming with specific components or service contexts. Additionally, there may be provided auto-completion of partial code based on the semantic understanding of the programming context (in form of a repository of programming patterns for specific components or service contexts); this can include an enabling of non-contiguous auto-completions for complex multi-statement patterns for the programming context(s), as well as a general enabling of auto-completions in the presence of interleaved partial snippets using multiple programming contexts.

Moreover, in accordance with at least one embodiment of the invention, there are broadly contemplated herein methods and arrangement for a dynamic instantiation-of and binding-to of distributed (e.g., cloud-based) programming contexts. This may involve a leveraging of the cloud to extend the benefits of playground to the most prevalent, distributed (n-tier) computing scenarios; likewise, the playground can be leveraged to ease, learn, and experiment with cloud based distributed components or services. Additionally, there may be provided an inferring of seeding-data (e.g., schema or data for a database service) for distributed components, services, or programming contexts, based on static and evaluated playground states.

The features discussed above, and others, relating to at least one embodiment of the invention, will be better appreciated from the discussion which follows. As a matter of relevance to the discussion, Java® and various derivatives are registered trademarks of Oracle Corporation (Redwood City, Calif.) and its affiliates, while Apache® and various derivatives are registered trademark of the Apache Software Foundation (Forest Hill, Md.).

Broadly contemplated herein, in accordance with at least one embodiment of the invention, are "smart playgrounds" for facilitating the rapid prototyping of code snippets through automatic resolution of programming context (such as required APIs), provisioning of external resources (such as back-end data and compute services) as well as the binding of handles to these resources in the original code. Such a system could be potentially useful in a range of different scenarios, from sharing code snippets on the Web (e.g., in Q&A [question and answer] sites or blogs) to experimenting with new ideas during a process of traditional software development. The term "playground" may generally be understood herein to refer to a workspace into which, inter alia, a user may freely copy and paste code snippets for testing; such a workspace can be configured in essentially any suitable manner at a user interface (e.g., it can appear as a particular window available at the user interface).

In accordance with a general background relative to at least one embodiment of the invention, programmers often rely on code snippets found on the Web to learn the use of an API or language feature. In fact, available Q&A sites can contain considerable coverage of a given API, and thus can be used to provide de-facto usage examples in addition to official API documentation. However, the most reliable or popular posts can often contain concise code snippets with implicit references to external dependencies and in-line placeholders for surrounding program context. If a user wishes to try out the code snippet for him/herself, then he/she must first fill in these gaps before the code becomes executable.

As such, in accordance with a general background relative to at least one embodiment of the invention, modern IDEs tend to contain sophisticated components for inferring missing types, correcting bad syntax and completing partial expressions in code fragments, but they are limited to the context which has been configured for a project. Hence, users usually need to manually ensure that the required APIs are available before expecting IDEs to perform auto-completion. Further, if the code fragment involves interaction with an external service, such as a file-system or running database server, the details of acquiring handles to such resources are also usually left for the users to supply. While it may be reasonable to assume, in some cases, that the run-time environment is available to the consumer of the snippet, the producer of the code snippet need not have had such a setup while shared it. This is especially true of snippets found on Q&A sites where answers are often customized to the context of a question. Further, even if the producer did have a similar environment set-up for themselves, the difference in the environment configurations of the producer and consumer could lead to unexpected discrepancies.

Generally, in accordance with a general background relative to at least one embodiment of the invention, it is recognized that in many domains, cloud computing technologies have enabled dynamic instantiation of ephemeral services and reduced the cost of setting up complex environments while increasing their re-use. In that connection it is the case that conventional IDEs and other programming playgrounds do not leverage the power of cloud computing to enable prototyping with complex environments.

Accordingly, it is recognized herein, in accordance with at least one embodiment of the invention, that a combination of programming playgrounds and cloud-based resource binding can create a powerful new paradigm for creating, sharing and consuming code fragments along with their implied contexts and required environments in a uniform and hassle-free manner.

In accordance with at least one embodiment of the invention, "smart programming playgrounds" accept as input an isolated code snippet and permit the same to be executed in a meaningful way through a three-step semi-automated process, involving context resolution, environment configuration and value binding.

In accordance with at least one embodiment of the invention, with context resolution, external code dependencies can be resolved (e.g., via downloading appropriate libraries and adding them to paths from which they can be referenced) along with syntactic incompleteness (such as unqualified API references or undefined variables); a code fragment can then be placed in a suitable program entry-point (such as a main method or an event handler). "Context resolution", or other references to "context" herein, can be understood to relate to determining or resolving one or more defining aspects of the code portion. By way of illustration, such defining aspects can include, e.g., the aforementioned external code dependencies, syntactic incompleteness and/or determination of a program entry-point.

In accordance with at least one embodiment of the invention, with environment configuration, a determination is made of physical and/or virtual resources referenced in the code fragment, and real or simulated services are instantiated to provide such resources (e.g., a database server, a search engine, a filesystem, a network interface). In this vein, placeholder data (e.g., a textbook schema, a sample search index or stock files and directories of a particular type) can also be provided, if desired or required.

In accordance with at least one embodiment of the invention, with value binding, a code fragment is enabled to access the aforementioned resources, via injecting into the fragment appropriate handles or references (e.g., connections, file-paths, URLs).

Figure 1:
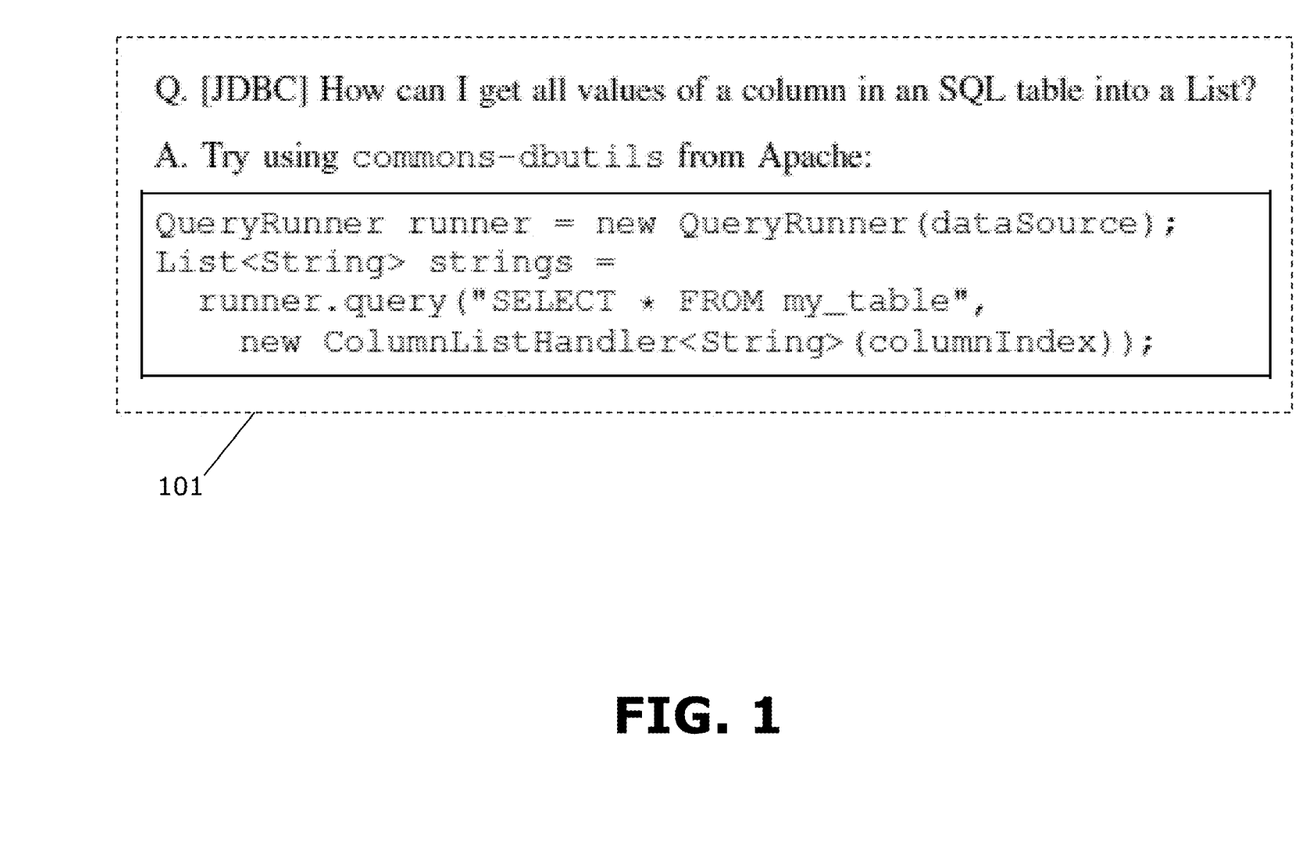
FIG. 1 sets forth an example of a post on a Q&A site with a code snippet.

In accordance with at least one embodiment of the invention, FIG. 1 sets forth an example of a post (101) on a Q&A site where a code snippet is involved. Here, the asker is looking for a way to read all values in a column of an SQL table and store these in a list of strings. Though the asker seems to be using a standard JDBC (Java Database Connectivity) interface, the accepted answer suggests the use of a third-party library to achieve the same goal. Accordingly, in a conventional setting, a reader can normally best understand and verify this answer by trying out the code themselves. However, merely copying this snippet into their own workspace does not enable such prototyping, since many challenges would be involved.

In accordance with the present working example, the snippet contains references to type names (such as List, QueryRunner and ColumnListHandler) which are unqualified and need to be properly imported. While modern IDEs can automatically insert import statements for types such as java.util.List that are in the standard library or elsewhere in a project's class-path, they cannot resolve types such as QueryRunner unless the required library APIs have been added in the project's build configuration. Hence, the first step that a user normally needs to do before trying this snippet is to download the dbutils library from Apache Commons and add it to their workspace.

Next, in accordance with the present working example, the code fragment contains undefined variables such as dataSource and columnIndex which need to be initialized. A modern IDE would be able to recognize, by looking at expected types of arguments to the constructors of QueryRunner and ColumnHandler, that these variables could be of type java.sql.DataSource and int, respectively. However, it is up to the user to actually bind values to these variables. While a user could simply enter a numeric value for the columnIndex value, it is not clear what the dataSource variable should reference.

Hence, in accordance with the present working example, the third step that a user normally would need to take is to ensure that there is indeed a database server running to which they can connect, and create a java.sql.DataSource object by setting up the appropriate connections in their code manually. Only after all three of these actions—context resolution, environment configuration and value binding—have been performed, can a user actually test the code snippet and examine its output.

In stark contrast to the disparate, uncoordinated steps noted above, in accordance with at least one embodiment of the invention, and focusing still on the present working example, a smart playground would automatically download and include the required dbutils JARs (Java Archive files), resolve type imports, provision a database in some virtual machine, and bind a data-source that can create connections to this database to the dataSource variable. If multiple solutions exist (e.g., as different versions of the library API or different types of database engines), the system would then prompt the user to choose a solution that fits their requirement.

As such, in accordance with at least one embodiment of the invention, a smart playground resource could also specify ways of manipulating its state outside of a code fragment, such by exposing a command-line (CLI) or graphical user interface (GUI). In our example, a user could quickly inspect and modify the schema and data in the provisioned database through a MySQL CLI or a web-based GUI. The execution of the code fragment would then lead to a meaningful outcome of actually retrieving values from one column of an SQL table into a list of strings.

Features and advantages such as those discussed above, in accordance with at least one embodiment of the invention, will now be better appreciated from the discussion herebelow.

Figure 2:
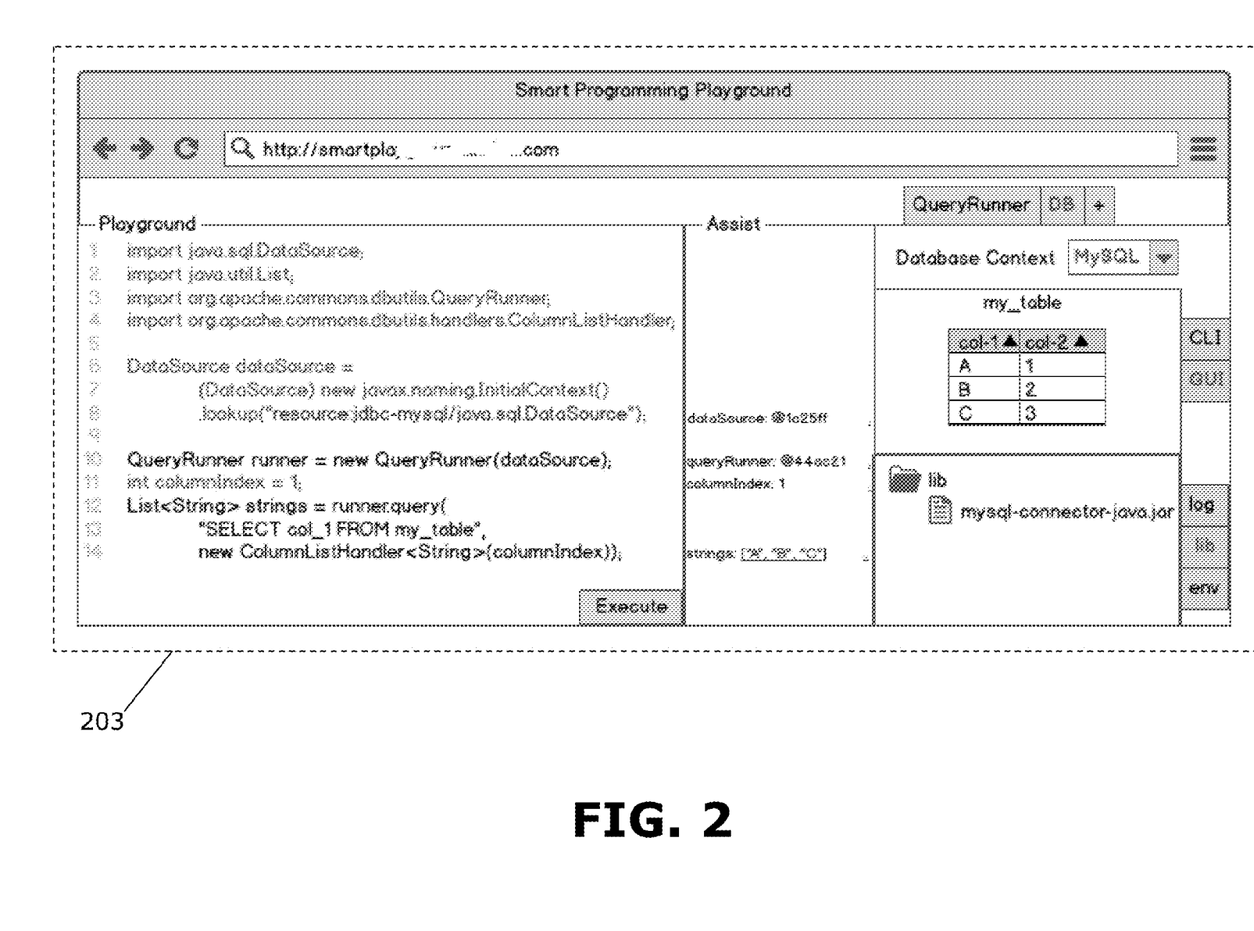
FIG. 2 schematically illustrates a front-end of a smart playground system.

FIG. 2 schematically illustrates a front-end 203 of a smart playground system, in accordance with at least one embodiment of the invention. In the illustrated scenario, a user is attempting to execute, in particular, the code snippet from FIG. 1. Generally shown here is the resource UI (user interface), transformed code, and corresponding output. Continued reference may be made to FIGS. 1 and 2 in the ensuing discussion.

Figure 3:
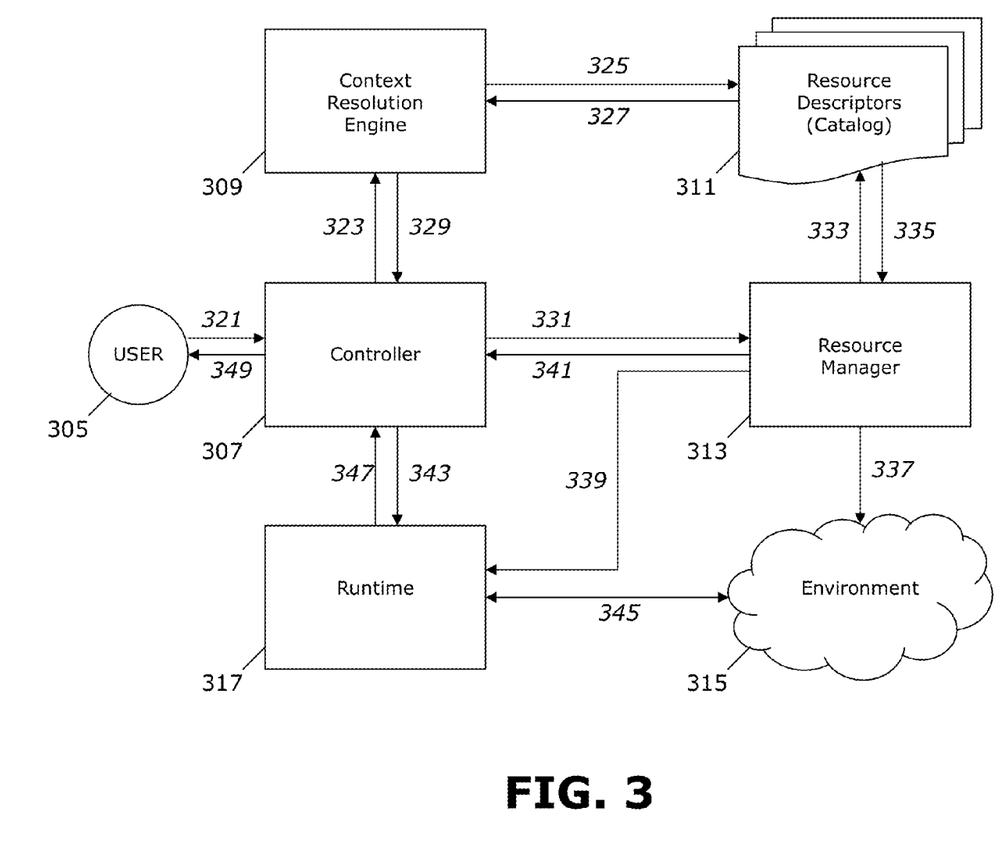
FIG. 3 schematically illustrates components of a smart programming playground architecture.

In accordance with at least one embodiment of the invention, FIG. 3 schematically illustrates components of a smart programming playground architecture, relative to a user 305. As shown, the controller 307 is a central component, comprising a main user-facing entity and also acting as a coordinator for various steps in the overall process. The context resolution engine 309 and resource manager 313 are responsible for resolving static and dynamic bindings, respectively. These components (309 and 313) refer to a catalog 311 of resource descriptors, which themselves serve to provide information about available resources. The environment 315 includes a set of provisioned resources and also serves as a source of statefulness in the system, for enabling an iterative prototyping process. A runtime engine 317, as shown, is also provided to run code. A more detailed description of constituent components of the illustrated architecture follows; reference will also variously be made to fifteen process steps 321-349 (shown in italics in FIG. 3, each adjacent an arrow indicating process flow).

In accordance with at least one embodiment of the invention, a resource comprises any external entity that is not directly specified in a code fragment (being explored or tested) but is required for the code's meaningful execution via runtime 317. Each resource is described in a standardized descriptor (contained in catalog 311) that can provide the following information: an arrangement or media to provision and de-provision the resource in the execution environment (e.g., scripts or service endpoints); a list of application programming interfaces (APIs) for accessing the resource in the language of the code fragment; and a set of programming patterns for resource handle creation and use, enabling instantiation and binding of resource handles to entities in program code.

Thus, by way of a working example in accordance with at least one embodiment of the invention, a dbc-mysql resource can be instantiated or destroyed by the creation and deletion of database schemas within a running server (or alternatively, by the installation and un-installation of entire database servers). To use this resource, the required API is the MySQL JDBC driver. This resource can be accessed in a Java code fragment by exposing a java.sql.DataSource object which is registered with a Java Naming and Directory Interface (JNDI) provider.

Essentially, in accordance with at least one embodiment of the invention, not all of the above facets need to be specified by every resource. For example, a commons-lang resource may only expose the Apache Commons Language Utilities API, but not insist on executing any scripts or binding any values in code. On the other hand, a sample-hashmaps resource may only provide a set of value bindings for defining HashMaps with dummy data to use in snippets that manipulate arbitrary maps. However, this resource does not require any special API or scripts to be run. Similarly, a debugger resource may execute scripts to start a remote debugging server for step-through execution, but this does not require any changes in code such as APIs to download or values to bind. This flexibility allows the system to extend in several compelling directions.

In accordance with at least one embodiment of the invention, the catalog 311 includes a store of pre-defined and user-plugged resources. Within the catalog 311, resources may depend on other resources, and thus instantiating one resource might cause another resource to instantiate implicitly. For example, a commons-dbutils resource may only expose the Apache Commons DBUtils API and a value binding for a QueryRunner, but depends on the jdbc-mysql resource for actually setting up a running database server with a usable schema. And yet, the QueryRunner object that this resource exposes can only be constructed with the DataSource binding exposed by the jdbc-mysql resource. Such complex relationships allow for easing the process of developing new extensions to the system very quickly.

In accordance with at least one embodiment of the invention, the controller 307 coordinates the entire process from receiving a code fragment (321) from the user 305 to returning a meaningful output (349). In this process, it makes use of the context resolution engine 309 for resolving static bindings and the resource manager 313 for configuring the environment and dynamic value bindings. As such, a typical implementation of the controller 307 may be a Web application with a rich editor front-end and a server-side component for transforming the code through various stages.

As such, in accordance with at least one embodiment of the invention, controller 307 receives an original source code fragment (321) from the user 305, and then sends the fragment (323) to context resolution engine 309. Context resolution engine 309 analyzes the original source code fragment and identifies implicit references to APIs, as well as notes all undefined variables and their types. It queries (325) the catalog 311 to find a candidate set of resources that match the APIs and value bindings required; essentially any suitable known approach may be used for determining the APIs referenced in a piece of un-compilable code. This candidate set is returned (327), and the controller 307 then receives anew (329) the list of selected resources (i.e., candidate resources) along with the code fragment; the code fragment, itself, has the previously undefined variables and types resolved.

In accordance with at least one embodiment of the invention, the list of selected resources and transformed code fragment are then sent (331) to resource manager 313. Essentially, resource manager 313 is responsible for instantiating the set of selected resources, maintaining their state across multiple iterations of the user editing the code fragment and providing fresh value bindings for each execution. As such, it is to be noted that while the life of instantiated resources extends across an entire session, the life of value bindings is for one execution only. For example, once provisioned, a MySQL database may continue to be used across multiple executions of the code fragment. However, each execution of the fragment will receive a newly created MySQL connection or data-source object bound to some variable in the fragment.

In accordance with at least one embodiment of the invention, the resource manager 313 refers the list of selected resources (333) back to catalog 311, to return a list of corresponding complete descriptors (335). Resource manager 313 instantiates services (337) in the environment 315, avails appropriate libraries (339) to runtime engine 317 and provides resource bindings (341) to controller 307. Final runnable code is then sent (343) to runtime 317, which then executes the code (345) via interaction with environment 315.

As such, in accordance with at least one embodiment of the invention, the runtime engine 317 executes the final code, with all static dependencies resolved and dynamic resource handles bound to appropriate values. As mentioned hereabove, the running program can manipulate the environment in a persistent manner. Output from this execution is then sent (347) back to controller 307, and relayed (349) back to user 305; the output can then be examined by the user 305 in a fine-grained manner via the controller 307. A typical implementation of the runtime engine 317 could utilize, by way of illustrative example, a read-eval-print-loop (REPL), which provides line-byline feedback of a fragment's execution.

In accordance with at least one embodiment of the invention, the architecture as shown in FIG. 3 is agnostic of any particular language or implementation technology, and as such should be able to accommodate a wide variety of programming paradigms and deployment scenarios. For example, the playground could: use Java code snippets as input, perform context resolution by resolving type imports and downloading JARs from an Apache Maven repository, bind resource handles to names using JNDI and execute code within a JVM. Alternatively, the code fragments could be written in server-side JavaScript and run in a NodeJS container. In this case, context resolution would involve the downloading of required NodeJS modules using Node's package manager, while resource handles would simply be serialized in JavaScript Object Notation (JSON).

Similarly, a great variety of arrangements for managing resources may be adopted in accordance with at least one embodiment of the invention. One strategy may allow resources to describe their provisioning and de-provisioning via shell scripts. The resource manager 313 may execute these scripts to provision such resources relative to an environment 315 that is a virtualized environment (such as a virtual machine, or a cloud platform). Another strategy may leverage platform as a service (PaaS) environments, to manage resources. In this case the entire service catalog 311 may be leveraged as resources, with provisioning and de-provisioning managed via the service broker endpoints in the PaaS. Components of the architecture may also be leveraged as plug-in extensions to existing playgrounds. For example, known interactive playgrounds may be extended via components as proposed herein, to work (or experiment) with distributed service components or resources hosted in the cloud, or with partial code-snippets picked from web-searches.

By way of additional specific working examples, in accordance with at least one embodiment of the invention, in the context of a Q&A site on the Internet, a code snippet in an answer can be made "alive" while also showing results of execution. To this end, a monetization model could offer a code editor and/or viewer one or more "widgets" for code snippets in provided answers. This could involve usage-based charging, backed by a cloud-based smart playground service that may be involved. In another possible implementation, smart playground service could be used in conjunction with an electronic document or book. Here, code snippets could be seen actively within the document or book, with an opportunity to experiment with code right in that location.

It can be appreciated from the foregoing that, in accordance with at least one embodiment of invention, a technical improvement is represented via provision of a smart programming playground that extends to programming with distributed components or services by inferring the context of such programming and enabling automatic instantiations-of, binding-to, seeding-of, and interacting-with such components or service contexts, to enable interactive try-it programming, wherein this can involve an inferring of the programming context from partial code snippets, based on semantic understanding of programming with specific components or service contexts.

In accordance with at least one embodiment of the invention, very generally, quantitative values as determined herein, or other data or information as used or created herein, can be stored in memory or displayed to a user on a screen, as might fit the needs of one or more users.

Figure 4:
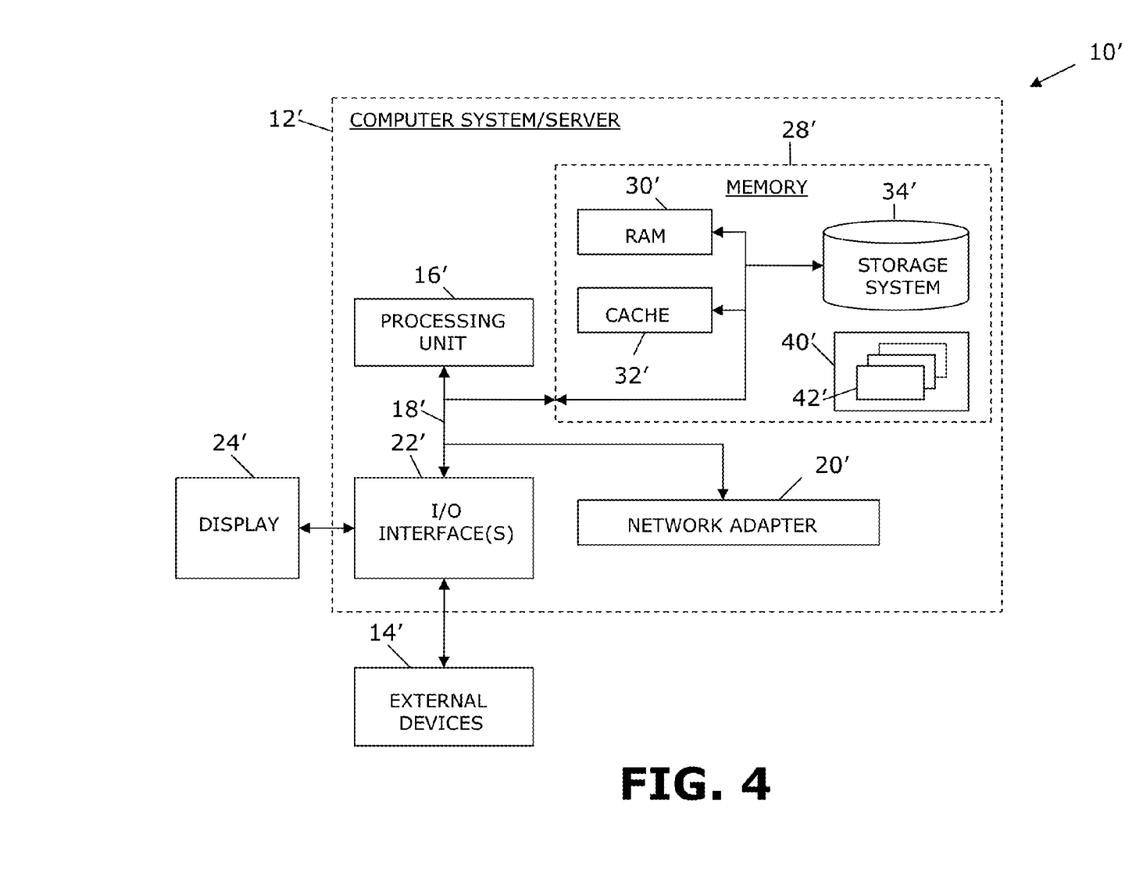
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of testing a portion of computer code, said method comprising:
   utilizing at least one processor to execute computer code configured to perform the steps of:
   providing a workspace, at a user interface, for testing a code portion;
   configuring the workspace to execute the code portion;
   analyzing the code portion to determine at least one defining aspect of the code portion, wherein the at least one defining aspect of the code portion comprises undefined variables;
   based on said determining of at least one defining aspect, determining one or more resources referenced in the code portion, wherein the one or more resources comprises an external component storing data associated with the code portion; and
   ensuring availability of the one or more resources referenced in the code portion, wherein ensuring availability comprises resolving type imports of the code portion, provisioning the one or more resources, and binding a data-source that can create connections to the one or more resources to the undefined variables.

2. The method according to claim 1, wherein said determining of at least one defining aspect comprises determining one or more external code dependencies inherent in the code portion.

3. The method according to claim 1, wherein said determining of at least one defining aspect comprises determining syntactic incompleteness of the code portion.

4. The method according to claim 1, wherein said determining of at least one defining aspect comprises determining a program entry point for the code portion.

5. The method according to claim 1, wherein said determining of one or more resources comprises determining one or more physical and/or virtual resources referenced in the code portion.

6. The method according to claim 1, comprising executing the code portion via instantiating one or more services to provide the one or more resources.

7. The method according to claim 1, wherein said ensuring of availability comprises inserting in the code portion at least one of: at least one handle and at least one reference.

8. The method according to claim 1, wherein the code portion is provided from a location other than a location associated with the user interface.

9. The method according to claim 1, wherein the code portion comprises code composed at the workspace.

10. The method according to claim 9, wherein the workspace permits selection of a resource with which to compose the code.

11. The method according to claim 10, wherein the workspace permits choosing of a semantic pattern of programming for the selected resource.

12. The method according to claim 11, wherein the workspace permits choosing from a set of registered patterns for the selected resource.

13. The method according to claim 11, wherein the workspace is configured to auto-complete the code portion with binding information relative to the selected resource.

14. An apparatus for testing a portion of computer code, said apparatus comprising:
   at least one processor; and
   a computer readable storage medium having computer readable program code embodied therewith and executable by the at least one processor, the computer readable program code comprising:
   computer readable program code configured to provide a workspace, at a user interface, for testing a code portion, wherein the workspace is configured to execute the code portion;
   computer readable program code configured to analyze the code portion to determine at least one defining aspect of the code portion, wherein the at least one defining aspect of the code portion comprises undefined variables;
   computer readable program code configured, based on the determining of at least one defining aspect, to determine one or more resources referenced in the code portion, wherein the one or more resources comprises an external component storing data associated with the code portion; and
   computer readable program code configured to ensure availability of the one or more resources referenced in the code portion, wherein ensuring availability comprises resolving type imports of the code portion, provisioning the one or more resources, and binding a data-source that can create connections to the one or more resources to the undefined variables.

15. A computer program product for testing a portion of computer code, said computer program product comprising:
   a computer readable storage medium having computer readable program code embodied therewith, the computer readable program code comprising:
   computer readable program code configured to provide a workspace, at a user interface, for testing a code portion, wherein the workspace is configured to execute the code portion;
   computer readable program code configured to analyze the code portion to determine at least one defining aspect of the code portion, wherein the at least one defining aspect of the code portion comprises undefined variables;

computer readable program code configured, based on the determining of at least one defining aspect, to determine one or more resources referenced in the code portion wherein the one or more resources comprises an external component storing data associated with the code portion; and computer readable program code configured to ensure availability of the one or more resources referenced in the code portion, wherein ensuring availability comprises resolving type imports of the code portion, provisioning the one or more resources, and binding a data-source that can create connections to the one or more resources to the undefined variables.

16. The computer program product according to claim 15, wherein determining at least one defining aspect comprises determining one or more external code dependencies inherent in the code portion.

17. The computer program product according to claim 15, wherein determining at least one defining aspect comprises determining syntactic incompleteness of the code portion.

18. The computer program product according to claim 15, wherein determining at least one defining aspect comprises determining a program entry point for the code portion.

19. The computer program product according to claim 15, wherein determining one or more resources comprises determining one or more physical and/or virtual resources referenced in the code portion.

20. A method comprising:
providing a workspace, at a user interface, for testing a code portion;
configuring the workspace to execute the code portion;
analyzing the code portion to determine at least one defining aspect of the code portion, wherein the at least one defining aspect of the code portion comprises undefined variables;
based on said determining of at least one defining aspect, determining one or more resources referenced in the code portion, wherein the one or more resources comprises an external component storing data associated with the code portion; and
ensuring availability of the one or more resources referenced in the code portion, wherein ensuring availability comprises resolving type imports of the code portion, provisioning the one or more resources, and binding a data-source that can create connections to the one or more resources to the undefined variables;
wherein said determining of at least one defining aspect comprises:
  determining one or more external code dependencies inherent in the code portion;
  determining syntactic incompleteness of the code portion; and
  determining a program entry point for the code portion;
wherein the code portion comprises code composed at the workspace; and
wherein the workspace permits selection of a resource with which to compose the code.

* * * * *